June 24, 1930. P. M. STRACKE 1,766,266
VARIABLE SPEED TRANSMISSION
Filed Dec. 22, 1926 2 Sheets-Sheet 1
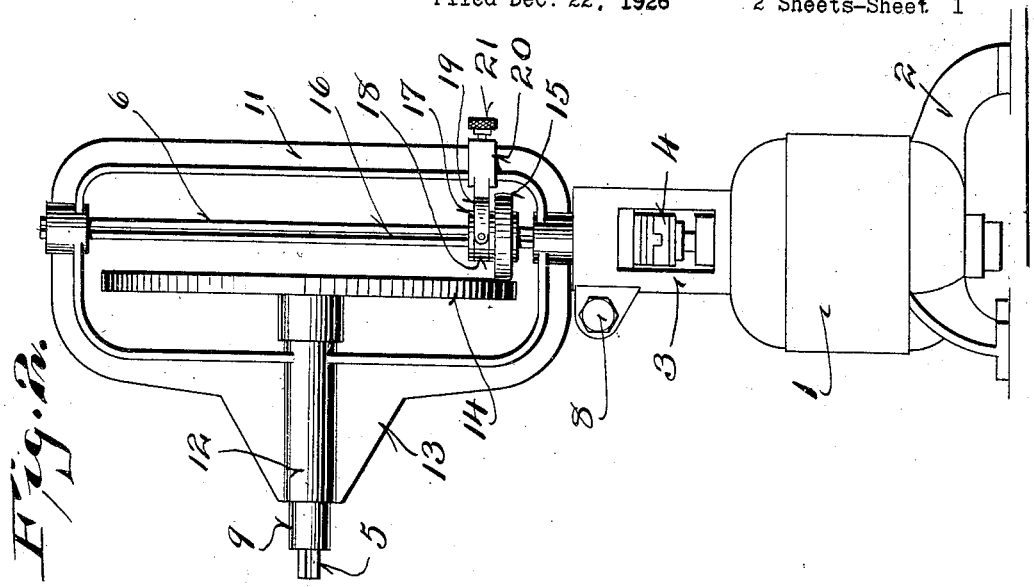
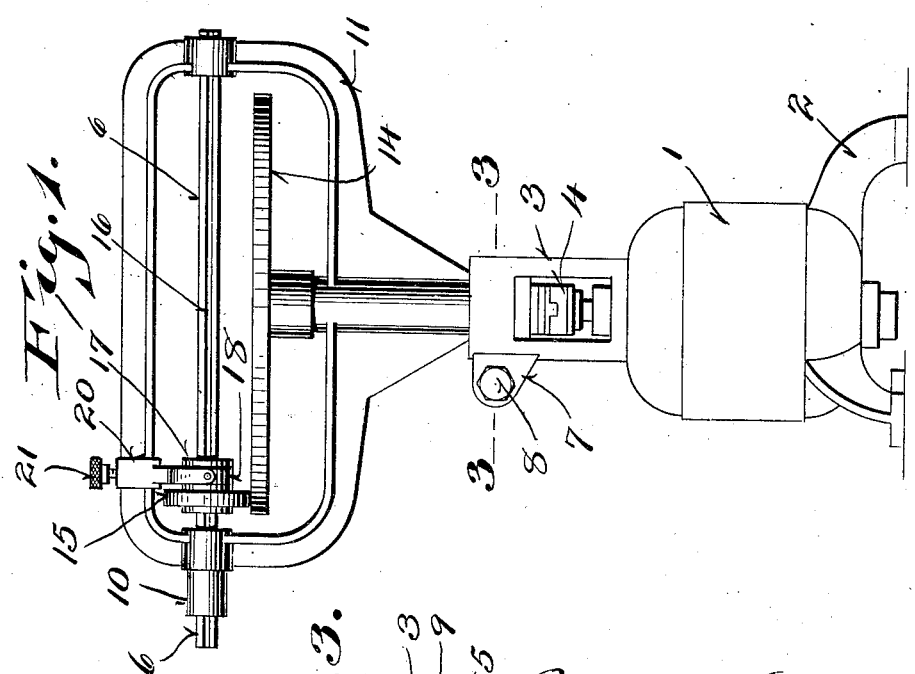
Inventor
Peter M. Stracke

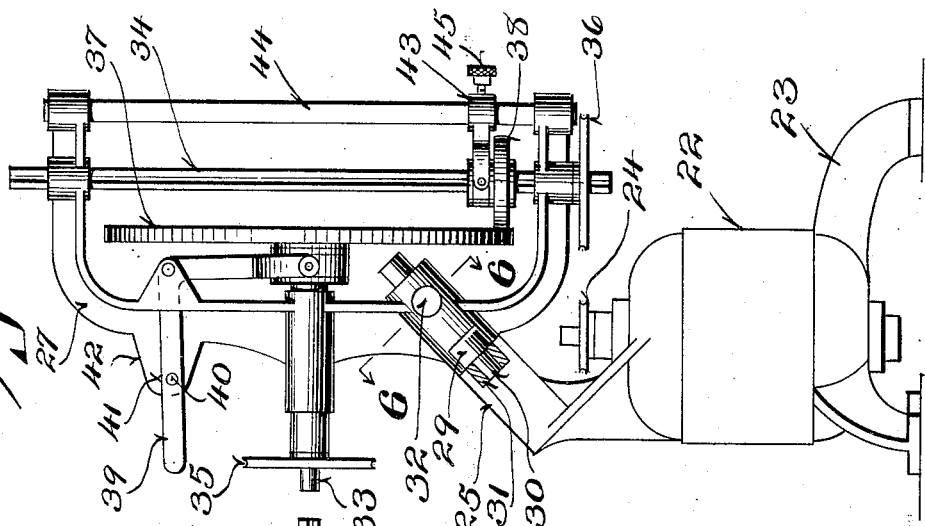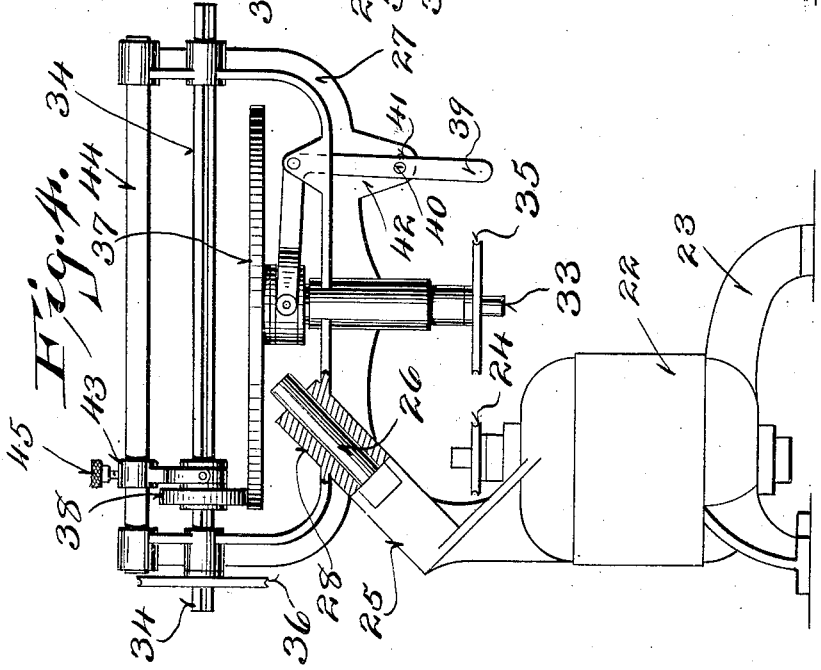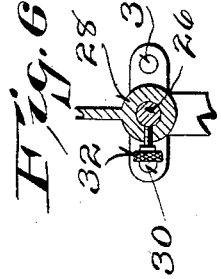

Patented June 24, 1930

1,766,266

UNITED STATES PATENT OFFICE

PETER M. STRACKE, OF RACINE, WISCONSIN

VARIABLE-SPEED TRANSMISSION

Application filed December 22, 1926. Serial No. 156,392.

This invention relates to a variable speed transmission.

Objects of this invention are to provide a novel form of variable speed transmission which may be associated with a driving means and is adapted primarily to drive light machines, either through belting, flexible shafts or other appropriate means, although it is to be understood that the invention may be applied to the driving of larger and heavier types of machines.

The primary object of this invention is to provide a novel form of variable speed transmission which may be shifted end for end or, in other words, reversed so that the driving may be from either end of the transmission to thus secure an extremely wide variation of speed without resorting to any impracticable or unserviceable constructions.

Further objects are to provide a reliable, simple, and sturdy form of variable speed transmission in which the variation throughout an enormous range of speed ratios may be secured by infinitesimal gradations.

Further objects are to provide a compact, simple, and cheap form of variable speed transmission which may be directly associated with a driving motor, if desired, and may be instantly changed so that the driving can occur from either end thereof.

Embodiments of the invention are shown in the accompanying drawings in which:—

Figure 1 is a side elevation of one form of the variable speed transmission associated with a driving motor and showing its setting at the highest speed;

Figure 2 is a similar view showing the transmission reversed and set for the lowest speed;

Figure 3 is a sectional view on the line 3—3 of Figure 1;

Figure 4 is a view similar to Figure 1 showing a modified form of the invention;

Figure 5 is a view showing the transmission illustrated in Figure 4 turned or reversed into its other position;

Figure 6 is a sectional view on the line 6—6 of Figure 5.

Figures 1, 2, and 3, showing the one form of the invention, will be first described.

Referring to these figures it will be seen that a vertical motor 1 is provided with a plurality of spaced legs 2 for supporting it in position. This motor is provided with a sleeve-like bracket member or clamp 3 which carries a flexible coupling 4 adapted to receive the splined ends of either of the shafts 5 or 6 of the transmission. The upper end of the member 3, as may be seen most clearly from Figure 3, is sleeve-like and split and provided with a pair of ears 7 through which a clamping bolt 8 is passed. This portion of the member 3 is adapted to clamp either the portion 9 or the portion 10 of the transmission. These portions 9 and 10 are turned down and are integral with the yoke 11 which carries the transmission mechanism and either is adapted to be slipped into the member 3 and clamped in position. It is preferable to form the yoke with a T-shaped section throughout its major portion, as shown in Figures 1 and 2 so as to secure the requisite strength and lightness. Further, for the relatively longer bearing portion 12, a pair of webs 13 are provided to secure the requisite strength.

The shafts 5 and 6 are so arranged that when the transmission is in either of its two positions, as shown in Figures 1 and 2, the driving shaft will be at the same relative point with respect to the motor while the driven shaft will be received by the upper portion of the flexible coupling 4.

The shaft 5 carries a friction disc 14 which is rigidly secured thereto and the shaft 6 carries a friction roller 15 which is connected slidably thereto by means of the keyway 16, a suitable key being, of course, carried by the friction roller 15. This friction roller is moved in any suitable manner towards or from the center of the disc 14. For example, it may be provided with a hub 17 which carries a sleeve 18, such sleeve being, in turn, connected to the arms 19 of a sliding member 20. This sliding member may be slid back and forth along one of the stretches or portions of the yoke 11 and may be locked in adjusted position by means of the thumb screw 21.

The operation of the apparatus is as follows: When the lowest speed is desired, the parts are set as shown in Figure 2, and a material reduction in speed occurs, so that the shaft 5 is driven at a considerably lower rate than the driving shaft of the motor. This speed can be gradually increased until the friction roller 15 approaches the center of the disc 14. When this point is reached, the bolt 8 is loosened, and the yoke is turned or reversed so that the shaft 5 now becomes the driving shaft, and the shaft 6, the driven shaft. The roller is now gradually moved from adjacent the center of the disc 14 to its periphery, as shown in Figure 1, thus changing the device over to its highest ratio when the parts are in the position shown in Figure 1. It will be seen that under these conditions, the shaft 6 travels at a very much higher rate of speed than the shaft 5.

One form of the device which may be given as an illustration of the range of speed of this apparatus, will give the shaft 5 in the position shown in Figure 2 from 200 to 900 R. P. M. Thereafter, when the device is turned end for end, or reversed, the range of speed is from 900 to 4000 R. P. M. It will be seen that all intermediate speeds can also be secured, as is obvious, by proper setting of the device.

Figures 4, 5, and 6 showing the second form of the invention will now be described. In this form, the vertical driving motor 22 is provided with the supporting feet 23 arranged in spaced relation and with a driving pulley 24. Further, this motor is provided with an angularly set bracket 25 which is provided with a pin 26 upon which the yoke 27 is pivotally mounted. This yoke is provided with a bearing 28 which receives the pin 26 and such bearing is provided with a pair of ears 29 which carry pins 30, such pins being adapted to be received in apertures formed in ears 31 integral with the bracket or support 25 by merely sliding the bearing 28 outwardly upon the pin and allowing it to move inwardly to position the pins 30. To keep the bearing 28 of the yoke from sliding outwardly upon the pin 26, a set screw 32 is provided as most clearly shown in Figure 6.

The yoke 27 carries shafts 33 and 34 which are provided with pulleys 35 and 36 either of which may be belted to the pulley 24 of the driving motor, as the pulleys 35 and 36 are identical. The shaft 33 carries a disc 37 which is keyed to such shaft and may be moved outwardly into contact with the friction wheel or roller 38 carried by the shaft 34 by means of the bell crank lever 39. This lever is pivoted to the yoke 27 and is provided with a pin 40 adapted to snap into either of the apertures 41 formed in an ear 42 integral with the yoke 27. The inner end of the bell crank lever 39 is forked and suitably operatively coupled to the hub of the disc 37. The wheel or roller 38 is slidably splined to the shaft 34 in a similar manner to that previously described, and is held by means of the sliding member 43. This sliding member may travel upon a portion of the yoke as previously described or it may travel upon a square bar 44 carried by the yoke 27, as shown in Figures 4 and 5. It is provided with a set screw 45 for locking it in adjusted position.

It is to be particularly understood that although a friction disc and a friction roller have been specifically described, that other ratio devices, such as sliding cones, for instance, could be employed so long as one of the members constitutes a main friction member, and the other an auxiliary friction member, so that the auxiliary friction member may be slid towards or from the center of the main friction member to thus vary the speed ratio.

It is also to be understood that the device, although primarily adapted for driving light machines, may obviously be built for the driving of larger types of machines.

It is to be understood that the means for interrupting the driving connection between the shafts, as described in connection with this form of the invention, may be applied to the first form of the invention in an obvious manner, or, if desired, the disc in each case may be coupled operatively to its shaft by means of a manually controlled clutch. The operation of this device so far as speed variation is concerned, is identical with that previously described. However, a slightly different form of driving connection with the motor is provided by means of the pulleys, either of which may be belted to the driving pulley of the motor. Further, the entire yoke is pivotally carried by the pin 26 and may be easily rocked into either of its two positions and thereafter held locked in the desired position by means of the cooperation of the pins 30 with the ears 31, the set screw 32 preventing inadvertent motion outwardly upon the pin 26.

It will be seen that a novel form of variable speed transmission has been provided which secures a very extensive speed variation heretofore considered impossible in actual practice. Further, it will be seen that the actual variation in the coupling of the two main shafts of the transmission does not have to include a very wide range, as this coupling variation or ratio variation may be used with either of the two shafts as the driving shaft, and the other, the driven shaft. Thus, an enormous speed variation can be secured by means of this simple, serviceable device.

It is to be noted that the friction roller may be slid past center, if desired, in order to secure a reverse direction of rotation. This mode of operation may be followed with either form of the invention.

Although the invention has been described in considerable detail, such invention is intended as illustrative rather than limiting as the invention may be variously embodied and as the scope of such invention is to be determined as claimed.

I claim:

1. The combination of a driving shaft, a support therefor, a yoke reversibly carried by said support, a pair of shafts carried by said yoke and arranged at right angles to each other, either of said shafts being adapted for driving connection with said driving shaft, a friction disc and a co-operating friction wheel carried by the shafts carried by the yoke, and means for sliding the friction wheel towards or from the center of the friction disc.

2. The combination of a driving shaft, a support therefor, a yoke reversibly carried by said support, a pair of shafts carried by said yoke and arranged at right angles to each other, either of said shafts being adapted for driving connection with said driving shaft, a friction disc and a co-operating friction wheel carried by the shafts carried by the yoke, means for interrupting the operative connection between the shafts carried by the yoke, and means for sliding the friction wheel towards or from the center of the friction disc.

3. The combination of a driving shaft, a support therefor, a yoke reversibly carried by said support, a pair of shafts carried by the yoke and arranged at right angles to each other, either of said shafts being adapted for driving connection with said driving shaft, a friction disc carried by one of said shafts, a cooperating friction wheel carried by the other shaft and normally engaging the disc, a hub on the second shaft upon which said friction wheel is mounted, a sliding member carried by the yoke and having connection with the hub whereby to adjust the friction wheel over the surface of said friction disc and a set screw carried by the sliding member for engaging the yoke for retaining said friction wheel in various adjusted positions.

In testimony that I claim the foregoing I have hereunto set my hand at Milwaukee, in the county of Milwaukee and State of Wisconsin.

PETER M. STRACKE.